(12) United States Patent  
Cohen

(10) Patent No.: US 9,325,689 B2
(45) Date of Patent: *Apr. 26, 2016

(54) TRANSCODING CONTENT BASED ON VERIFICATION OF OWNERSHIP OF THE CONTENT

(71) Applicant: Google Inc., Mountain View, CA (US)

(72) Inventor: Gabriel A. Cohen, Alameda, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/200,778

(22) Filed: Mar. 7, 2014

(65) Prior Publication Data

US 2014/0189832 A1 Jul. 3, 2014

Related U.S. Application Data

(63) Continuation of application No. 13/452,432, filed on Apr. 20, 2012, now Pat. No. 8,671,458.

(60) Provisional application No. 61/478,435, filed on Apr. 22, 2011.

(51) Int. Cl.
| | |
|---|---|
| *G06F 7/04* | (2006.01) |
| *H04L 29/06* | (2006.01) |
| *G06F 21/10* | (2013.01) |
| *G06F 21/62* | (2013.01) |

(52) U.S. Cl.
CPC .............. *H04L 63/08* (2013.01); *G06F 21/10* (2013.01); *G06F 21/6209* (2013.01); *G06F 2221/2117* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 2002/0194501 A1* | 12/2002 | Wenocur et al. | ............... 713/201 |
| 2004/0221118 A1 | 11/2004 | Slater et al. | |
| 2005/0060240 A1 | 3/2005 | Popofsky | |
| 2008/0005802 A1 | 1/2008 | Fierstein et al. | |
| 2008/0270307 A1 | 10/2008 | Olson et al. | |
| 2009/0024716 A1 | 1/2009 | Reynolds, Jr. | |

FOREIGN PATENT DOCUMENTS

WO     WO 2004/070558     8/2004

OTHER PUBLICATIONS

Sebastian Anthony, "Amazon Cloud Player review: functional, not mind blowing, and still US-only," http://downioadsquad.switched.com, dated Mar. 29, 2011, 4 pages.
Claire Cain Miller, "Amazon Introduces a Digital Music Locker," http://bits.blogs.nytimes.com, dated Mar. 29, 2011, 6 pages.

(Continued)

*Primary Examiner* — Brandon Hoffman
(74) *Attorney, Agent, or Firm* — Fish & Richardson P.C.

(57) ABSTRACT

A computer-implemented method includes generating data indicative of one or more times in which to sample content of a first resource and content of a second resource; receiving, from a client device, content of the first resource sampled at the one or more times; comparing the sampled content from the first resource to content sampled from the second resource at the one or more times; determining, based on comparing, that the first resource includes a same resource as the second resource; verifying, based on determining, ownership of the second resource; generating, based on a verifying, a user key specifying ownership of the second resource; and transmitting the user key to the client device.

21 Claims, 4 Drawing Sheets

(56) References Cited

OTHER PUBLICATIONS

Ryan Nakashima, "UltraViolet Digital Movie Locker Would Let You Play Movies Anywhere," HuffingtonPost.com, Jul. 20, 2010, 6 pages.
Rafe Needleman, "Crazy Zediva streams movies only out on DVD," *Rafe's Radar—CNET News*, dated Mar. 26, 2011, 6 pages.
PCT Notification of Transmittal of International Search Report and Written Opinion of International Searching Authority from International Application No. PCT/US2012/034488, dated Jul. 11, 2012.
Ritchie et al., "UPnP AV Architecture: 1" Internet Citation XP002592211, Jun. 25, 2002, pp. 1-22.
International Preliminary Report on Patentability mailed Oct. 31, 2013 in international application No. PCT/US2012/034488, 7 pgs.
Sandoval, "Will Hollywood's 'UltraViolet' plan replace the DVD?", retrieved from the internet on Mar. 18, 2011 at http://news.cnet.com/8301-31001_3-20027-261.html, 6 pgs.
Hoffman, Brandon S., "USPTO Non-Final Office Action", U.S. Appl. No. 13/452,432, dated Jun. 17, 2013, 7 pgs.
Fish & Richardson P.C., "Interview Summary, and Amendment in Reply to Action of Jun. 17, 2013", U.S. Appl. No. 13/452,432, dated Sep. 6, 2013, 11 pgs.

\* cited by examiner

TRANSCODING CONTENT BASED ON VERIFICATION OF OWNERSHIP OF THE CONTENT

CROSS-REFERENCE TO RELATED APPLICATIONS

This application is a continuation application and claims priority under 35 U.S.C. §120 to U.S. patent application Ser. No. 13/452,432, filed on Apr. 20, 2012 and issued as U.S. Pat. No. 8,671,458, which claims the benefit of priority under 35 U.S.C. §119(e) to provisional U.S. Patent Application 61/478,435, filed on Apr. 22, 2011, the entire contents of each application is hereby incorporated by reference.

TECHNICAL FIELD

This document relates generally to transcoding content based on verification of ownership of the content.

BACKGROUND

Digital versatile discs ("DVDs") are used to distribute digital content, including, e.g., videos, movies, music, software, games, and so forth. A DVD uses a copy-protection methodology known as Content Scrambling System ("CSS") to prevent copying of the digital content stored on the DVD to other storage media, e.g., by copying the content on the DVD to an optical disc or by copying the content on the DVD to a computer's hard drive.

SUMMARY

In one aspect of the present disclosure, a computer-implemented method includes generating data indicative of one or more times in which to sample content of a first resource and content of a second resource; receiving, from a client device, content of the first resource sampled at the one or more times; comparing the sampled content from the first resource to content sampled from the second resource at the one or more times; determining, based on comparing, that the first resource includes a same resource as the second resource; verifying, based on determining, ownership of the second resource; generating, based on a verifying, a user key specifying ownership of the second resource; and transmitting the user key to the client device.

Implementations of the disclosure may include one or more of the following features. In some implementations, the client device includes a first client device, the user key includes a first user key, and the method further includes: receiving, from a second client that differs from the first client device, (i) a request for the second resource formatted in accordance with a format type, and (ii) a second user key; determining a match between the first user key and the second user key; selecting transcoded content that (i) corresponds to the content of the second resource, and (ii) is in accordance with the requested format type; and sending the transcoded content to the second client device.

In still other implementations, the second resource includes an audio file. In some implementations, the content of the first resource sampled at the one or more times includes a fingerprint of the first resource, the content sampled from the second resource at the one or more times includes a fingerprint of the second resource, and wherein comparing includes; comparing the fingerprint of the first resource to the fingerprint of the second resource.

In other implementations, the method includes transmitting the first user key to the second client device; wherein the first user key is a same user key as the second user key. In still other implementations, the method includes generating an association between the user key and the second resource, wherein the user key includes data specifying an identity of a user that is authorized to access the second resource. In some implementations, the user key includes a first user key, and the method further includes: sending (i) a request for the second resource formatted in accordance with a format type, and (ii) a second user key, wherein the second user key includes a same user key as the first user key; and receiving transcoded content that (i) corresponds to the content of the second resource, and (ii) is in accordance with the requested format type.

In yet another aspect of the disclosure, a computer-implemented method includes receiving, by a first client device, data indicative of one or more times in which to sample content of a first resource; generating one or more samples of content of the first resource at the one or more times; receiving a user key authorizing access to a second resource with same content as the first resource; and sending to a second client device the user key to promote access of the second resource from the second client device.

In another aspect of the disclosure, one or more machine-readable media are configured to store instructions that are executable by one or more processing devices to perform operations including generating data indicative of one or more times in which to sample content of a first resource and content of a second resource; receiving, from a client device, content of the first resource sampled at the one or more times; comparing the sampled content from the first resource to content sampled from the second resource at the one or more times; determining, based on comparing, that the first resource includes a same resource as the second resource; verifying, based on determining, ownership of the second resource; generating, based on a verifying, a user key specifying ownership of the second resource; and transmitting the user key to the client device. Implementations of this aspect of the present disclosure may include one or more of the foregoing features.

In still another aspect of the disclosure, an electronic system includes one or more processing devices; and one or more machine-readable media configured to store instructions that are executable by the one or more processing devices to perform operations including: generating data indicative of one or more times in which to sample content of a first resource and content of a second resource; receiving, from a client device, content of the first resource sampled at the one or more times; comparing the sampled content from the first resource to content sampled from the second resource at the one or more times; determining, based on comparing, that the first resource includes a same resource as the second resource; verifying, based on determining, ownership of the second resource; generating, based on a verifying, a user key specifying ownership of the second resource; and transmitting the user key to the client device. Implementations of this aspect of the present disclosure may include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system that transcodes content from one format type to another format type, e.g., following verification of ownership of the content by a user of the system. Generally, transcoding includes converting data from one format type to another format type. In an example, transcoded content includes a resource formatted in accordance with a format type. Generally, a resource includes an item of data, including, e.g., a website, a web page, an audio file, an audio visual file, a document, and so forth.

In an example, a user of the system owns an item that stores content. In this example, the item includes a physical item, e.g., a DVD that stores a movie. In other examples, the physical item may include a compact disc ("CD"), a Blu-ray disc, and so forth. In other examples, the item that stores content includes an electronic item, including, e.g., an electronic version of a song that is stored on a computing device, as described in further detail below.

In an example, the user plays a DVD on a computing device that includes a DVD player. The user may want to view the movie on other computing devices that does not include a DVD player, for example, a smart phone, a digital media player, and so forth. To access the movie on the other computing devices, the system verifies the user's ownership of the DVD, for example, by generating a fingerprint of the content included on the DVD. Generally, a fingerprint includes a digital summary of data that can be used to identify the data in a data repository.

Using the fingerprint of the content on the DVD, the system verifies ownership of the DVD for the user, for example, by matching the fingerprint to known portions of the movie. Following verification of ownership, the system makes the contents of the DVD accessible to the user in other format types, including, e.g., a Moving Picture Experts Group Layer-3 Audio ("MP3") format type, a Waveform Audio File ("WAV") format type, and so forth. By having access to the movie in various format types, the user may access the movie from various, different computing devices. In an example, the user accesses the movie from a computing device by downloading and/or streaming the movie to the computing device in a format type that is supported by the computing device.

Figure 1:
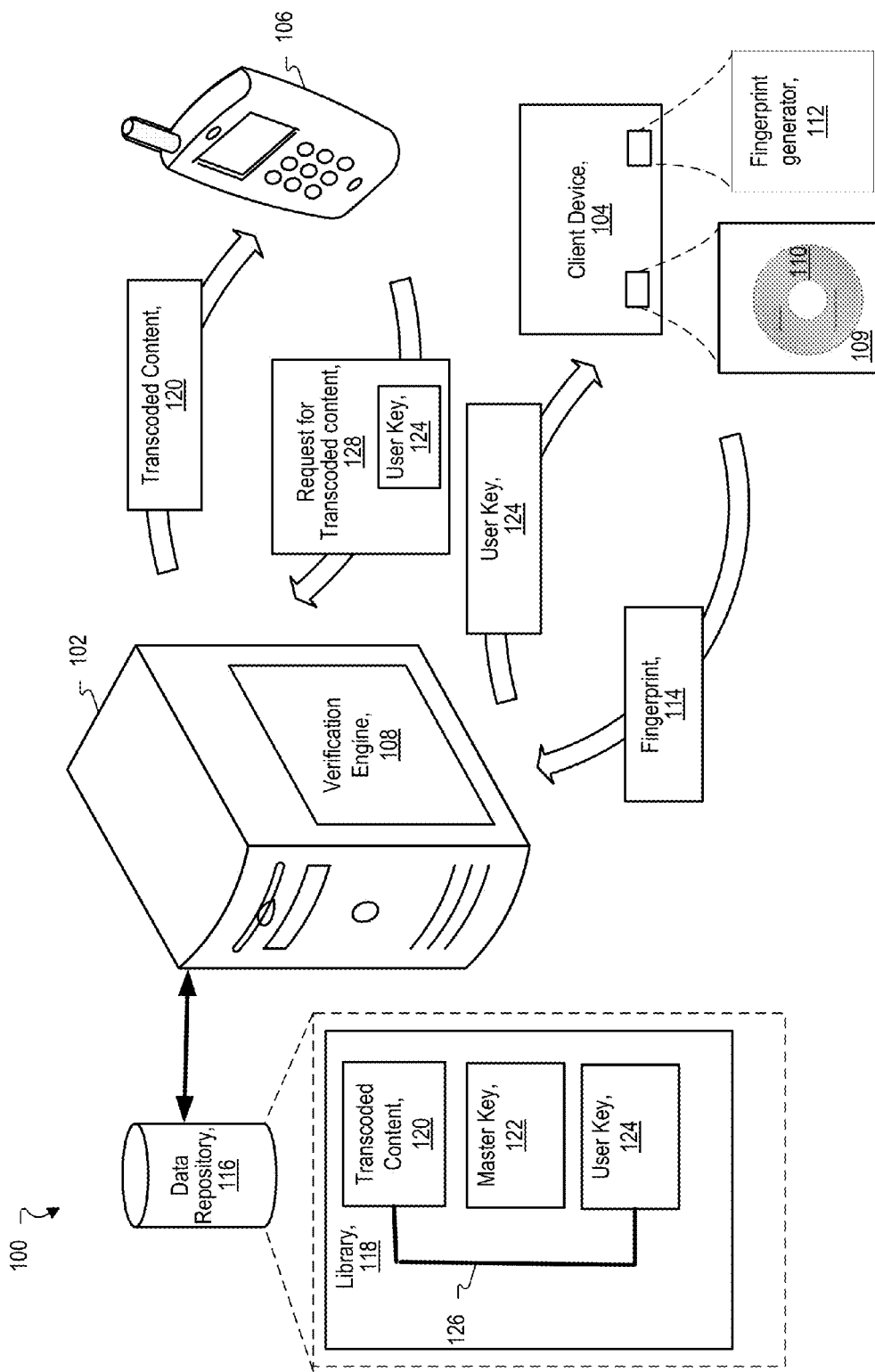
FIG. 1 is a conceptual diagram of a system that transcodes content based on verification of ownership of the content.

FIG. 1 is a conceptual diagram of system 100 that transcodes content based on verification of ownership of the content. System 100 includes server 102 and client devices 104, 106. Server 102 includes verification engine 108 that is configured to verify ownership of content, e.g., as described in further detail below.

Client device 104 includes content player 109. Content player 109 includes a multi-media player that is configured to play content stored on a physical item, including, e.g., disc 110. Client device 104 also include fingerprint generator 112. Fingerprint generator 112 includes software that is configured to run on client device 104. Fingerprint generator 112 is configured to generate fingerprint 114 of the content included on disc 110.

System 100 also includes data repository 116. Data repository 116 includes library 118. Library 118 stores content in multiple format types. In an example, library 118 stores transcoded content 120. Generally, transcoded content 120 includes content that has been formatted in a particular format type and that corresponds to content encoded in another, different format type, e.g., on a physical item. Generally, a correspondence includes a similarity between two items of data. In an example, server 102 is configured to generate transcoded content 120 by converting the content stored on disc 110 from one format type to another format type. In this example, the content included in transcoded data 120 corresponds to the content included on disc 110.

Library 118 also stores master key 122. Generally, master key 122 includes information indicative of the contents stored on an item (e.g., disc 110). In an example, master key 122 includes a fingerprint of a resource, including, e.g., an audio file stored on disc 110. In an example, server 102 generates master keys for numerous items of content, including, e.g., movies that have been released on DVD (and/or Blu-ray), television shows that have been released on DVD (and/or Blu-ray), music that has been released on CD, and so forth.

In the example of FIG. 1, fingerprint generator 112 generates fingerprint 114 by sampling content ("sampled content") from the contents stored on disc 110. In an example, fingerprint generator 112 is configured to sample the contents on disc 110 by obtaining one-hundred items of sampled content, with each item of sampled content being one second in duration. Fingerprint generator 112 packages the sampled content as fingerprint 114 and sends fingerprint 114 to server 102.

Fingerprint generator 112 also obtains identification information associated with a user of client device 104. Generally, identification information includes information that uniquely identifies the user of client device 104. In an example, identification information includes login information (e.g., a username and a password) associated with client device 104, a media access control ("MAC") address of client device 104, and so forth. In another example, when client device 104 launches fingerprint generator 112, fingerprint generator 112 prompts a user of client device 104 for identification information of the user. Fingerprint generator 112 also inserts into fingerprint 114 the identification information for the user of client device 104.

In response to receiving fingerprint 114, verification engine 108 compares the contents of fingerprint 114 to master key 122 to determine whether master key 122 includes the contents of fingerprint 114. In an example, fingerprint 114 includes sampled content from disc 110. In this example, each item of sampled content is associated with a timestamp specifying an elapsed amount of time from the beginning of the content until an occurrence of the sampled content. Verification engine 108 selects from master key 122 portions of content that correspond in time to the timestamps of the sampled content included in fingerprint 114. Verification engine 108 determines whether the contents in the selected portions of master key 122 match the sampled content from disc 110. When verification engine 108 determines a match, verification engine 108 verifies ownership of disc 110 for the user of client device 104. Following verification of the ownership of disc 110, the user of client device 104 is authorized to access transcoded content 120.

To promote a user's ability to access transcoded content 120, verification engine 108 generates user key 124 and associates user key 124 with transcoded content 120. User key 124 includes information uniquely identifying the user of client device 104 and is at least partly based on the identification information included in fingerprint 114. In an example, user key 124 includes a randomly-generated alpha-numeric string that is unique to the user of client device 104. Server 102 sends user key 124 to client device 104. Following receipt of user key 124 by client device 104, the user of client device 104 may access and/or view user key 124. As described in further detail below, user key 124 is used by the user of client device 104 to access transcoded content 120, for example, from another computing device (e.g., client device 106).

In an example, verification engine 108 associates user key 124 with transcoded content 120 through pointer 126. Generally, a pointer includes a reference from one data structure to another data structure. Through the association between user key 124 and transcoded content 120, data repository 116 stores information specifying that a user of client device 104 is authorized to access transcoded content 120, for example, from other computing devices.

In the example of FIG. 1, the user of client device 104 also uses client device 106. The user of client device 106 wants to view the contents of disc 110 on client device 106. Client device 106 may not include a content player that is configured to play disc 110. Additionally, client device 106 may be configured to support format types that differ from the format type of disc 110. In this example, to view the contents of disc 110 on client device 106, the user of client device 106 accesses transcoded content 120, which may be formatted in a format type that is supported by client device 106.

In an example, client device 106 generates request 128 for transcoded content 120. In this example, request 128 for transcoded content 120 includes information specifying a name of the requested content (e.g., a name of a movie, a name of a television program, a name of a song, and so forth). In the example of FIG. 1, request 128 for transcoded content 120 includes information specifying the name of the content on disc 110. Request 128 for transcoded content 120 also includes information specifying a requested format type for the requested content. In the example of FIG. 1, the requested format type corresponds to a format type support by client device 106

Request 128 for transcoded content 120 also includes user key 124. In an example, client device 106 receives user key 124 when the user of client device 106 inputs user key 124 into client device 106, e.g., through a graphical user interface. In another example, client device 106 receives user key 124 from server 102. In this example, the user enters into client device 104 information specifying addresses of other computing devices from which the user wants to access transcoded content 120. Fingerprint generator 112 includes this information in fingerprint 114. Using the addresses of the other computing devices from which the user wants to access transcoded content 120, verification engine 108 sends user key 124 to the other computing devices, including, e.g., client device 106.

In an example, an application configured to run on client device 106 generates request 128 for transcoded content 120. In this example, the application includes a web browser that displays a graphical user interface into which the user of client device 106 enters information specifying a name of the requested content. Through the graphical user interface, the user may also enter information indicative of user key 124.

In response to receiving request 128 for transcoded content 120, verification engine 108 determines the name of the requested content. Verification engine 108 also determines the requested format type for the requested content. In an example, transcoded content 120 is associated with information specifying a name of the content included in transcoded content 120. Transcoded content 120 is also associated with information specifying the format type associated with transcoded content 120.

Various items of transcoded content stored in library 118 may be associated with numerous, different format types. In this example, verification engine 108 determines a match among the requested name and the requested format type and the name and the format type of transcoded content 120. Transcoded content 120, which matches the requested name and the requested format type included in request 128, is sent to client device 106, e.g., following verification of user 124, as described below.

Verification engine 108 also verifies that the user of client device 106 is authorized to access transcoded content 120. Verification engine 108 compares user key 124 included in request 128 for transcoded content 120 to the user keys associated with various items of transcoded content in library 118. In the example of FIG. 1, user key 124 is associated with transcoded content 120 via pointer 126. Verification engine 108 determines a match between user key 124 included in request 128 and user key 124 associated with transcoded content 120. In this example, verification engine 108 determines that the user of client device 106 is authorized to access transcoded content 120 and sends transcoded content 120 to client device 106. Following access of transcoded content 120 by client device 106, the user of client device 106 may view transcoded content 120 on client device 106. In an example, transcoded content 120 is downloaded to client device 106. In another example, rather than downloading transcoded content 120 onto client device 106, server 102 streams transcoded content 120 to client device 106.

Figure 2:
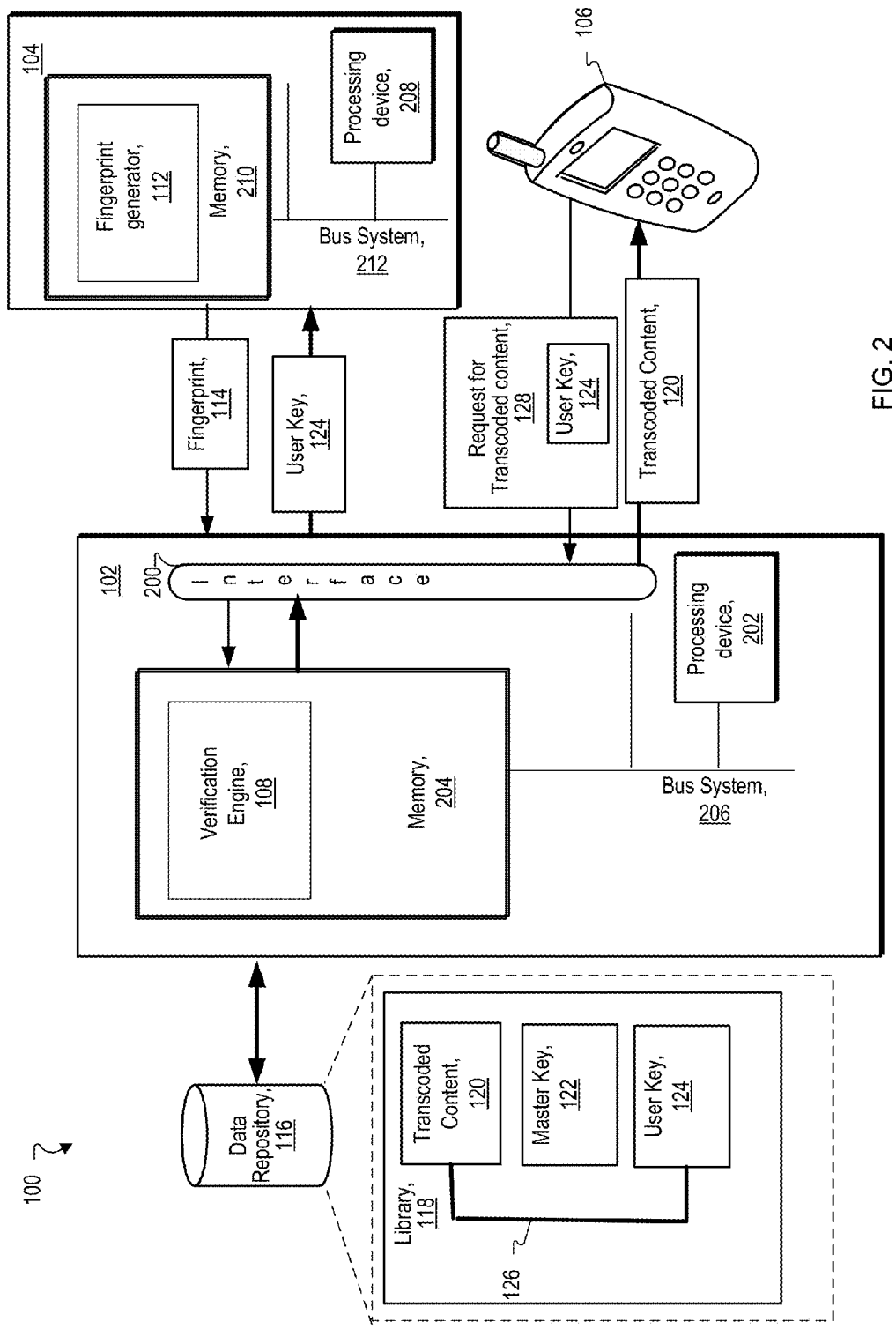
FIG. 2 is a block diagram of components of the system that transcodes content based on verification of ownership of the content.

FIG. 2 is a block diagram of components of system 100 that transcodes content based on verification of ownership of the content. In FIG. 2, content player 109 and disc 110 are not shown.

Client devices 104, 106 can be any sort of computing devices capable of taking input from a user and communicating over a network (not shown) with server 102 and/or with other client devices. For example, client devices 104, 106 can be mobile devices, desktop computers, laptops, cell phones, personal digital assistants ("PDAs"), servers, embedded computing systems, mobile devices, and so forth.

Server 102 can be any of a variety of computing devices capable of receiving information, such as a server, a distributed computing system, a desktop computer, a laptop, a cell phone, a rack-mounted server, and so forth. Server 102 may be a single server or a group of servers that are at a same location or at different locations.

Server 102 can receive information from client devices 104, 106 via input/output ("I/O") interface 200. I/O interface 200 can be any type of interface capable of receiving information over a network, such as an Ethernet interface, a wireless networking interface, a fiber-optic networking interface, a modem, and so forth. Server 102 also includes a processing device 202 and memory 204. A bus system 206, including, for example, a data bus and a motherboard, can be used to establish and to control data communication between the components of server 102.

Processing device 202 may include one or more microprocessors. Generally, processing device 202 may include any appropriate processor and/or logic that is capable of receiving and storing data, and of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. These computer programs include verification engine 108.

Client device 104 also includes processing device 208 and memory 210. A bus system 212, including, for example, a data bus and a motherboard, can be used to establish and to control data communication between the components of client device 104. As shown in FIG. 2, memory 210 stores computer programs that are executable by processing device 208 in client device 104. These computer programs include fingerprint generator 112.

In an example, verification engine 108 is further configured to send to fingerprint generator 112 a request for random sampled content, for example, from disc 110 (FIG. 1). Generally, random sampled content includes content, e.g., from disc 110, associated with timestamps that have been randomly generated by verification engine 108. The request for random sampled content includes information indicative of the timestamps that were randomly generated by verification engine 108.

In an example, verification engine 108 randomly generates timestamps, e.g., using a random number generator. In this example, fingerprint generator 112 is configured to obtain from disc 110 random sampled content corresponding in time to the randomly generated timestamps received from verification engine 108. Fingerprint generator 112 packages the random sampled content and the associated timestamps in a fingerprint that is sent to verification engine 108.

In an example, verification engine 108 may request random sampled content to decrease an ability of a user to falsify ownership of content (e.g., ownership of disc 110). In this example, a user of a client device may not actually own disc 110. Rather, the user may be attempting to falsify ownership of disc 110. In an attempt to falsify the ownership, the user may employ software to generate a false fingerprint. Generally, a false fingerprint includes a fingerprint that is generated to emulate ownership of content. In an example, the false fingerprint includes sampled content from an illegally obtained copy of disc 110.

In this example, verification engine 108 detects the false fingerprint by determining that the sampled content included in the false fingerprint does not match the random sampled content requested by verification engine 108. By requesting random sampled content, verification engine 108 decreases a likelihood of verifying a false fingerprint as authorized to access transcoded content 120.

In this example, the timestamps are randomly generated by verification engine 108. As such, a user of the client device that is generating the false fingerprint cannot identify which timestamps are generated by verification engine 108. Accordingly, verification engine 108 decreases an ability of a client device to generate a false fingerprint that includes content corresponding in time to the randomly generated timestamps.

In an example, verification engine 108 is configured to verify ownership of a physical item, e.g., disc 110. In this example, fingerprint generator 112 uses the techniques described herein to generate a fingerprint from the physical item. In another example, verification engine is configured to verify ownership of an electronic item, including, e.g., content that has been purchased from an online vendor and downloaded to computing device. In this example, verification engine 108 generates a fingerprint from content included in the electronic item and verifies ownership of the electronic item using the foregoing techniques.

In still another example, fingerprint generator 112 is configured to generate fingerprints of numerous, different media types, including, e.g., movies, music, books, and so forth. The numerous, different media types may be included on physical items and/or electronic items.

In another example, verification engine 108 may be configured to use numerous techniques to verify ownership of content, including, e.g., using fingerprints, as previously described. In another example, verification engine 108 verifies ownership of a physical item using a radio-frequency identification ("RFID") tag associated with the physical item. In this example, the radio tag encodes a physical unclonable function ("PUF"), as is commonly known in the art. In an example, a client device sends to verification engine 108 information included in the RFID tag, including, e.g., the PUF. Verification engine 108 validates the received PUF, for example, by determining a match between the received PUF and a known PUF, e.g., that is retrieved from an external data repository that stores PUFs.

In still another example, verification engine 108 may use information that uniquely identifies ownership of content, including, e.g., information included in digital receipts and/or physical receipts. Generally, a digital receipt includes digital information indicative of a purchase. In an example, a digital receipt includes an e-mail specifying details of a purchase, e.g., a time in which a purchase was made, a vendor from which the purchase was made, and so forth. A physical receipt includes a physical item that depicts information indicative of a purchase. In an example, a physical receipt includes a paper receipt showing that a user purchased disc 110.

In an example, verification engine 108 uses a unique identifier included in a receipt (e.g., a digital receipt and/or a physical receipt) to verify ownership of content. A unique identifier includes data that uniquely identifies ownership of content by a particular user, for example, by identifying that the particular user purchased the content.

In an example, verification engine 108 is configured to use a digital receipt to verify ownership of content. In this example, verification engine 108 receives a digital receipt from client device 106. Using the contents of the digital receipt, namely the unique identifier, verification engine 108 identifies an item of content owned by the user of client device 106. In an example, data repository 116 includes a digital receipt index that stores information included in a digital receipt, including, e.g., a name of the content that was purchased, a time of purchase, a name of vendor from which the content was purchased, a unique identifier associated with the purchase, and so forth. In another example, the digital receipt index may be included in a data repository that is external to system 100.

In an example, data repository 116 may collect digital receipts from numerous information feeds received from retailers, vendors, online communities, and so forth. The received information feeds may include information indicative of purchases made by users, unique identifiers associated with the purchases, and/or information included in the digital receipts. In this example, data repository 116 is configured to store the information included in the information feeds in the digital receipt index.

In an example, when verification engine 108 receives a digital receipt, verification engine 108 verifies an authenticity of the digital receipt by determining whether an entry in the digital receipt index matches the contents of the received digital receipt. In this example, verification engine 108 determines the unique identifier included in the digital receipt. Verification engine 108 also determines whether a unique identifier included in the digital receipt index matches the unique identifier included in the digital receipt. When verification engine 108 determines a match, verification engine 108 has verified ownership of content associated with the digital receipt. Following verification of ownership, verification engine 108 selects transcoded content corresponding to the content for which ownership was verified and sends the selected, transcoded content to a client device. While the foregoing techniques are described with regard to digital receipts, the foregoing techniques are equally applicable to physical receipts, e.g., including a unique identifier.

In another example, verification engine 108 is configured to grant a user of client device 106 access to transcoded content 120 for a limited period of time, including, e.g., four hours, a day, a week, a month, and so forth. In this example, following expiration of the limited period of time, server 102 removes access to transcoded content 120 for client device 106.

Figure 3:
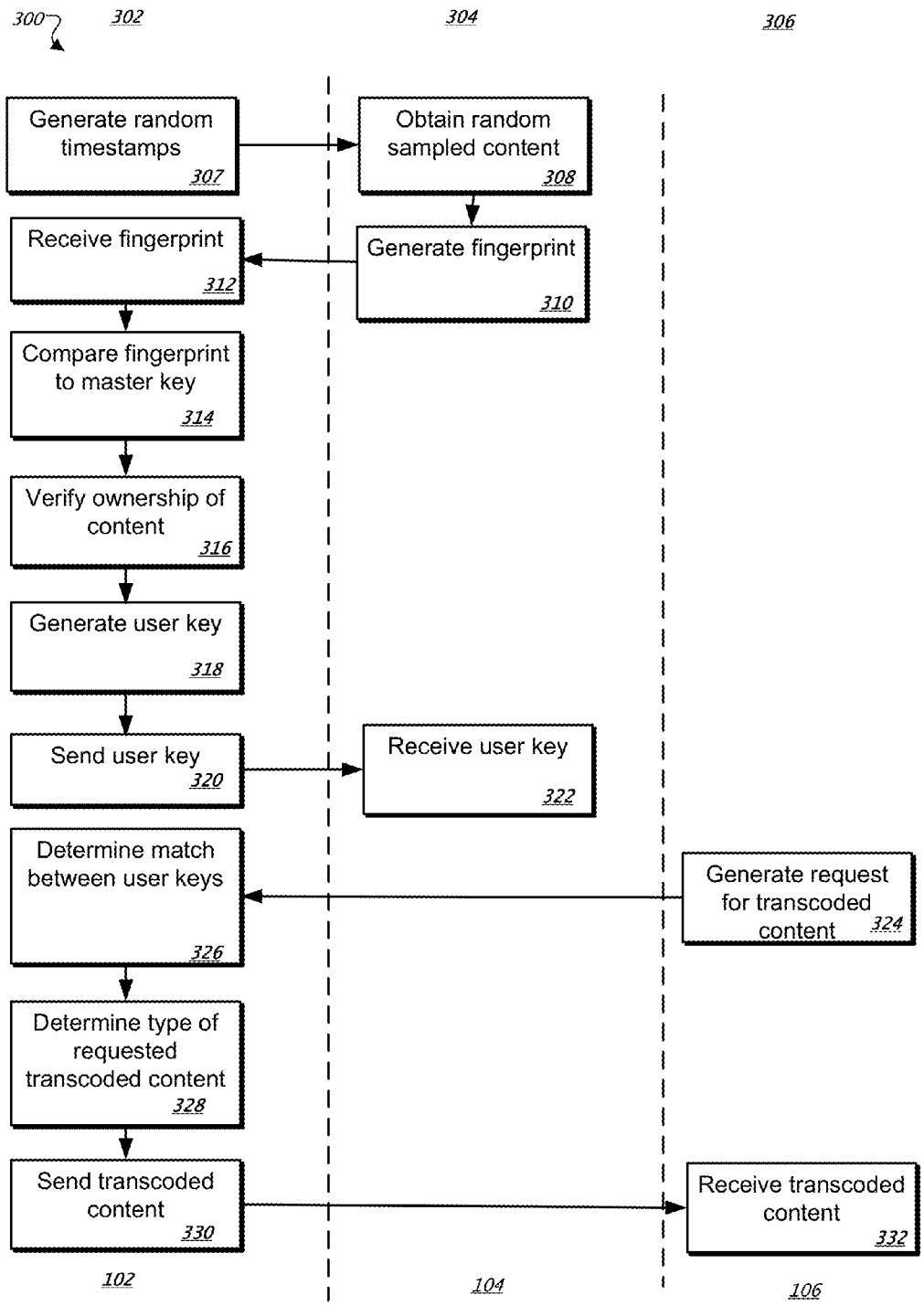
FIG. 3 is a flow diagram of an example process for generating transcoded content based on verification of ownership of content.

FIG. 3 is a flow diagram of an example process 300 for generating transcoded content 120 based on verification of ownership of the content.

In FIG. 3, process 300 is split into a left part 302, which is performed on server 102, a center part 304, which is performed on client device 104, and a right part 306, which is performed on client device 106 (e.g., the left part, or a portion thereof, is performed by verification engine 108 and the center part, or a portion thereof, is performed by fingerprint generator 112). Actions shown in FIG. 3 may be assigned differently. For example, in other implementations, actions performed by client device 104 may be performed client device 106, and vice versa.

In operation, verification engine 108 generates (307) random timestamps. Generally, a timestamp includes data specifying one or more times in which to sample content of a resource. Verification engine 108 packages (not shown) the random timestamps in a request for random sampled content and sends (not shown) the request to client device 104.

Client device 104 receives (not shown) the request for random sampled content. In response, fingerprint generator 112 obtains (308) random sampled content from disc 110 (FIG. 1) that corresponds in time to the randomly generated timestamps included in the request for random sampled content. Using the random sampled content, fingerprint generator 112 generates (310) fingerprint 114. As previously described, fingerprint 114 may also include identification information that uniquely identifies the user of client device 104. Client device 104 sends (not shown) fingerprint 114 to server 102.

Server 102 receives (312) fingerprint 114. Verification engine 108 compares (314) fingerprint 114 to master key 122, for example, to determine whether master key 122 matches fingerprint 114. In an example, fingerprint 114 includes random sampled content from disc 110. As previously described, verification engine 108 selects portions of master key 122 that correspond in time to the random timestamps generated by verification engine 108. In this example, verification engine 108 determines that the random sampled content in fingerprint 114 matches the selected portions of master key 122. Based on the match, verification engine 108 verifies (316) ownership of disc 110 by a user of client device 104.

Verification engine 108 also generates (318) user key 124. As described above, user key 124 may be generated from identification information included in fingerprint 114. Verification engine 108 generates (not shown) an association (e.g., via pointer 126) between user key 124 and transcoded content 120 to specify that the user of client device 104 is authorized to access transcoded content 120. Verification engine 108 sends (320) user key 124 to client device 104. Client device 104 receives (322) user key 124 and renders a visual representation of user key 124 for the user of client device 104. As described in further detail below, the user uses user key 124 to access transcoded content 120 from client device 106.

In the example of FIG. 3, the user of client device 106 wants to access transcoded content 120 from client device 106. In this example, client device 106 generates (324) request 128 for transcoded content 120. Request 128 for transcoded content 120 includes a requested name and a requested format type. As previously described, an application configured to run on client device 106 may generate request 128 for transcoded content 128. The application may also include user key 124 in request 128 for transcoded content 120, for example, based on the user inputting information indicative of user key 124 into the application. Client device 106 sends request 128 for transcoded content 120 to server 102.

In response to receiving request 128 for transcoded content 120, verification engine 108 determines (326) that user key 124 included in request 128 for transcoded content 120 matches user key 124 associated with transcoded content 120 in data repository 116. Based on the determined match, verification engine 108 identifies the user of client device 106 as authorized to access transcoded content 120. Using the contents of request 128 for transcoded content 120, verification engine 108 determines (328) a requested name and a requested format type for the requested content. Verification engine 108 selects (not shown) from data repository 116 transcoded content (e.g., transcoded content 120) matching the requested name and the requested format type. Verification engine 108 sends (330) transcoded content 120 to client device 106. Client device 106 receives (332) transcoded content 120 and renders (e.g., plays back) transcoded content 120 for the user of client device 106.

In a variation of FIG. 3, verification engine 108 is unable to verify ownership of content. Verification engine 108 may be unable to verify ownership of content for numerous reasons, including, e.g., a fingerprint is a false fingerprint.

In another example, verification engine 108 may be unable to verify ownership of content when the content is "un-indexed content." Un-indexed content includes content that is not stored in library 118, for example, when library 118 does not include transcoded content for the particular content. In this example, a fingerprint includes sampled content from un-indexed content, with an item of sampled content associated with a timestamp indicative of an amount of elapsed time from the start of the un-indexed content until an occurrence of the sampled content.

In this example, verification engine 110 determines whether the fingerprint for the un-indexed content matches master key 122. Verification engine 110 selects from master key 122 portions of content corresponding in time to the timestamps included in the fingerprint for the un-indexed content. In this example, master key 122 is for content included on disc 110. The content on disc 110 differs from the un-indexed content. The sampled contents included in the fingerprint for the un-indexed content do not match the selected contents from master key 122. In this example, verification engine 108 is also unable to determine a match between the fingerprint for the un-indexed content and other master keys included in library 118. Verification engine 108 sends client device 104 a message indicating an inability to verify ownership.

In another variation of FIG. 3, transcoded content 120 is associated with a plurality of user keys, e.g., one of which is user key 124. In this example, verification engine 108 determines that the user of client device 106 is not authorized to access transcoded content 120. In this example, verification engine 108 determines that a user key included request 128 for transcoded content 120 does not match the user keys, including, e.g., user key 124, associated with transcoded content 120. When verification engine 108 determines that the user of client device 106 is not authorized to access transcoded content 120, verification engine 108 generates and sends to client device 106 a message indicating that the user is not authorized to access transcoded content 120. In this example, verification engine 108 may be unable to verify that a user is authorized to access transcoded content 120, e.g., when the user mistypes user key 124 into client device 106.

In still another variation of FIG. 3, client device 104 generates a request for transcoded content 120 and receives transcoded content 120. In this example, the user of client device 104 wants to view the contents of disc 110 on client device 104 in a format type that differs from the format type of disc 110. Using the techniques described herein, verification engine 108 is configured to verify ownership of disc 110, for example, using the information included in fingerprint 114.

Following verification of ownership of disc 110, verification engine 108 is configured to send to a client device (e.g., client device 104 and/or client device 106) transcoded content 120 that includes content in a format type supported by the client device. In an example, transcoded content 120 may include content in numerous, different formats, e.g., for different types of client devices with different form factors and performance capabilities.

Figure 4:
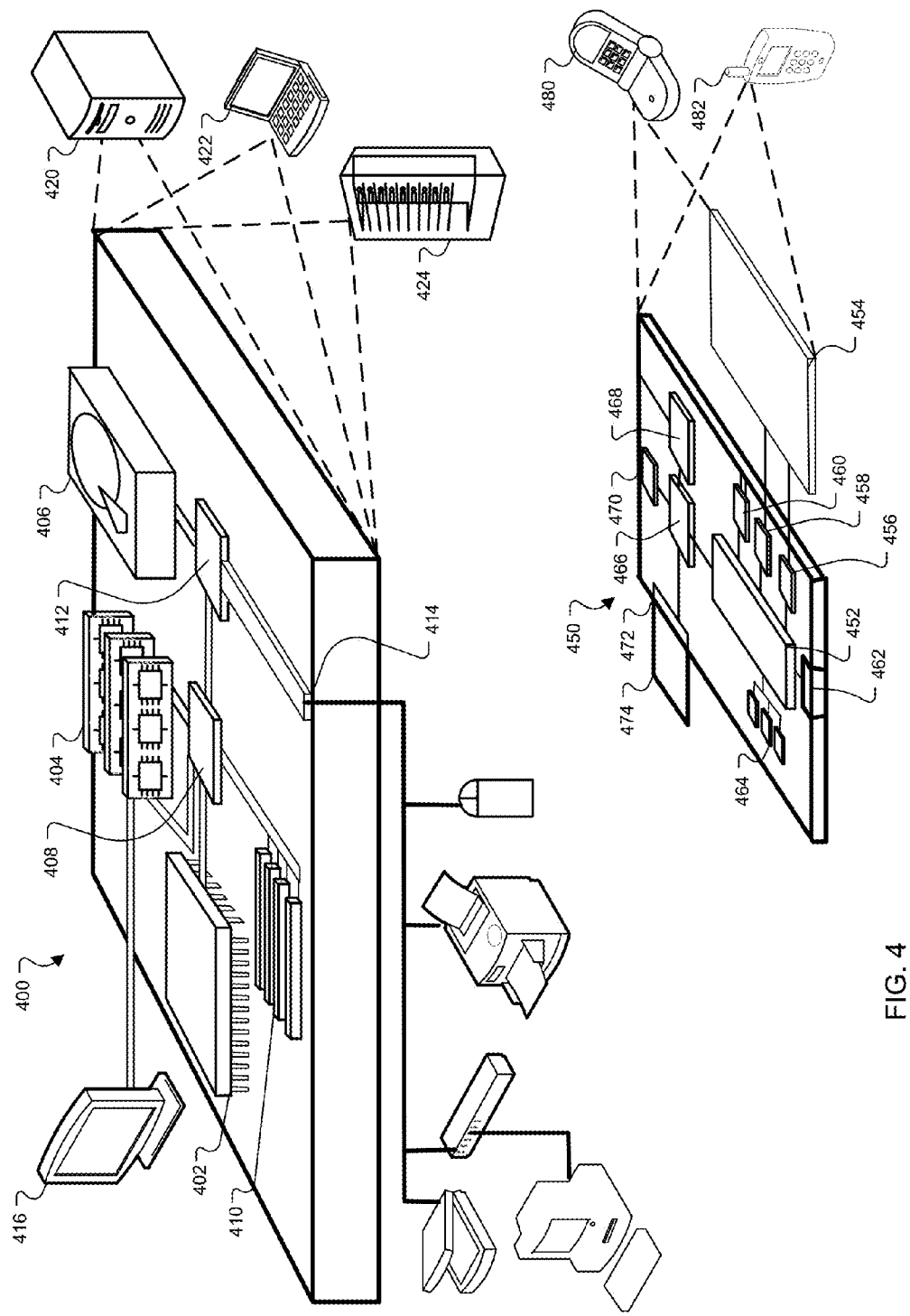
FIG. 4 shows an example of a computer device and a mobile computer device that can be used to implement the techniques described herein.

FIG. 4 shows an example of a computer device 400 and a mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 may process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disc.

The storage device 406 is capable of providing mass storage for the computing device 400. In one implementation, the storage device 406 may be or contain a computer-readable medium, such as a floppy disc device, a hard disc device, an optical disc device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 may execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 540 with other devices. External interface 462 may provide, for example, for wired communication in some implementations, or for wireless communication in other implementations, and multiple interfaces may also be used.

The memory 464 stores information within the computing device 450. The memory 464 may be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical discs, memory, Programmable Logic Devices (PLDs)) used to provide machine instructions and/or data to a programmable processor, including a machine-readable medium that receives machine instructions.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, or tactile feedback). Input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. Other steps may be provided, or steps may be eliminated, from the described flows, and other components may be added to, or removed from, the described systems.

A number of implementations have been described. Nevertheless, it will be understood that various modifications may be made without departing from the spirit and scope of the processes and techniques described herein. Accordingly, other implementations not specifically described herein are also within the scope of the following claims.

What is claimed is:

1. A computer-implemented method comprising:
   receiving, from a client device, information indicative of a sampling of digital content at one or more timestamps and a request to verify ownership of the digital content;
   accessing the digital content from a data repository;
   sampling the digital content accessed at the one or more time stamps;
   comparing the received information indicative of the sampling of the digital content at the one or more timestamps to information indicative of the sampling of the digital content accessed from the data repository at the one or more timestamps; and
   determining, based on comparing, that the received information corresponds to the information indicative of the other sampling of the digital content at the one or more timestamps to verify ownership of the digital content.

2. The computer-implemented method of claim 1, further comprising:
   generating a user key specifying ownership of the digital content.

3. The computer-implemented method of claim 2, wherein the client device comprises a first client device, wherein the user key comprises a first user key, and wherein the method further comprises:
   receiving, from a second client that differs from the first client device, (i) a request for the digital content formatted in accordance with a format type, and (ii) a second user key;
   determining a match between the first user key and the second user key;
   selecting transcoded content that (i) corresponds to the digital content, and (ii) is in accordance with the requested format type; and
   sending the transcoded content to the second client device.

4. The computer-implemented method of claim 3, further comprising:
   transmitting the first user key to the second client device;
   wherein the first user key is a same user key as the second user key.

5. The computer-implemented method of claim 2, wherein the user key comprises data specifying an identity of a user that is authorized to access the digital content.

6. The computer-implemented method of claim 1, wherein an audio file comprises the digital content.

7. The computer-implemented method of claim 1, wherein the received information indicative of the sampling of the digital content at the one or more timestamps comprises a first fingerprint, the accessed information indicative of another sampling of the digital content at the one or more timestamps comprises a second fingerprint, and wherein comparing comprises:
   comparing the first fingerprint to the second fingerprint.

8. A system comprising:
   one or more processing devices; and
   one or more machine-readable devices storing instructions that are executable by the one or more processing devices to perform operations comprising:
      receiving, from a client device, information indicative of a sampling of digital content at one or more timestamps and a request to verify ownership of the digital content;
      accessing the digital content from a data repository;
      sampling the digital content accessed at the one or more time stamps;
      comparing the received information indicative of the sampling of the digital content at the one or more timestamps to information indicative of the sampling of the digital content accessed from the data repository at the one or more timestamps; and
      determining, based on comparing, that the received information corresponds to the information indicative of the other sampling of the digital content at the one or more timestamps to verify ownership of the digital content.

9. The system of claim 8, wherein the operations further comprise:
   generating at user key specifying ownership of the digital content.

10. The system of claim 9, wherein the client device comprises a first client device, wherein the user key comprises a first user key, and wherein the operations further comprise:
    receiving, from a second client that differs from the first client device, (i) a request for the digital content formatted in accordance with a format type, and (ii) a second user key;
    determining a match between the first user key and the second user key;
    selecting transcoded content that (i) corresponds to the digital content, and (ii) is in accordance with the requested format type; and
    sending the transcoded content to the second client device.

11. The system of claim 10, wherein the operations further comprise:
    transmitting the first user key to the second client device;
    wherein the first user key is a same user key as the second user key.

12. The system of claim 9, wherein the user key comprises data specifying an identity of a user that is authorized to access the digital content.

13. The system of claim 8, wherein an audio file comprises the digital content.

14. The system of claim 8, wherein the received information indicative of the sampling of the digital content at the one or more timestamps comprises a first fingerprint, the accessed information indicative of another sampling of the digital content at the one or more timestamps comprises a second fingerprint, and wherein comparing comprises:
    comparing the first fingerprint to the second fingerprint.

15. One or more machine-readable devices storing instructions that are executable by one or more processing devices to perform operations comprising:
    receiving, from a client device, information indicative of a sampling of digital content at one or more timestamps and a request to verify ownership of the digital content;
    accessing the digital content from a data repository;
    sampling the digital content accessed at the one or more time stamps;
    comparing the received information indicative of the sampling of the digital content at the one or more timestamps to information indicative of the sampling of the digital content accessed from the data repository at the one or more timestamps; and
    determining, based on comparing, that the received information corresponds to the information indicative of the other sampling of the digital content at the one or more timestamps to verify ownership of the digital content.

16. The one or more machine-readable devices of claim 15, wherein the operations further comprise:

generating a user key specifying ownership of the digital content.

17. The one or more machine-readable devices of claim 16, wherein the client device comprises a first client device, the user key comprises a first user key, and wherein the operations further comprise:

receiving, from a second client that differs from the first client device, (i) a request for the digital content formatted in accordance with a format type, and (ii) a second user key;

determining a match between the first user key and the second user key;

selecting transcoded content that (i) corresponds to the digital content, and (ii) is in accordance with the requested format type; and sending the transcoded content to the second client device.

18. The one or more machine-readable devices of claim 17, wherein the operations further comprise:

transmitting the first user key to the second client device; wherein the first user key is a same user key as the second user key.

19. The one or more machine-readable devices of claim 16, wherein the user key comprises data specifying an identity of a user that is authorized to access the digital content.

20. The one or more machine-readable devices of claim 15, wherein an audio file comprises the digital content.

21. The one or more machine-readable devices of claim 15, wherein the received information indicative of the sampling of the digital content at the one or more timestamps comprises a first fingerprint, the accessed information indicative of another sampling of the digital content at the one or more timestamps comprises a second fingerprint, and wherein comparing comprises:

comparing the first fingerprint to the second fingerprint.

* * * * *